US012415354B2

(12) United States Patent
Mori et al.

(10) Patent No.: US 12,415,354 B2
(45) Date of Patent: Sep. 16, 2025

(54) LIQUID EJECTION HEAD AND EJECTION APPARATUS

(71) Applicant: CANON KABUSHIKI KAISHA, Tokyo (JP)

(72) Inventors: Tatsurou Mori, Tokyo (JP); Takuya Iwano, Tokyo (JP); Tomoki Tsuji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 18/513,118

(22) Filed: Nov. 17, 2023

(65) Prior Publication Data

US 2024/0173975 A1 May 30, 2024

(30) Foreign Application Priority Data

Nov. 30, 2022 (JP) ................................ 2022-191507

(51) Int. Cl.
*B41J 2/14* (2006.01)

(52) U.S. Cl.
CPC .. *B41J 2/14201* (2013.01); *B41J 2002/14491* (2013.01)

(58) Field of Classification Search
CPC .................... B41J 2/14201; B41J 2002/14491
See application file for complete search history.

(56) References Cited

U.S. PATENT DOCUMENTS

2020/0001604 A1 * 1/2020 Takeuchi ............... B41J 2/1623

FOREIGN PATENT DOCUMENTS

JP 2014004767 A 1/2014

* cited by examiner

*Primary Examiner* — Lisa Solomon
(74) *Attorney, Agent, or Firm* — Canon U.S.A., Inc. IP Division

(57) ABSTRACT

A liquid ejection head includes an ejection element substrate, an electrical contact portion, a housing, and an opening/closing member. The ejection element substrate ejects liquid to perform recording. The electrical contact portion is electrically connected to an electrical wiring unit of an ejection apparatus to supply power to the ejection element substrate. The housing includes an opening portion into which the electrical wiring unit is inserted and to be provided with the electrical contact portion inside. The opening/closing member opens and closes the opening portion. In a closed state in which the opening/closing member closes the opening portion, the electrical wiring unit is sandwiched between the opening/closing member and a part of the housing.

15 Claims, 23 Drawing Sheets

LIQUID EJECTION HEAD AND EJECTION APPARATUS

BACKGROUND

Field

The present disclosure relates to a liquid ejection head and an ejection apparatus.

Description of the Related Art

Ink jet recording apparatuses include liquid ejection heads that eject liquid to recording media. In particular, the liquid ejection heads used for business purposes, such as business, commercial, and industrial applications, require high durability for long-term use. One factor that reduces durability of a liquid ejection head is, for example, infiltration of liquid into electrical contact portions between an ink jet recording apparatus and the liquid ejection head. The factors causing the infiltration of liquid into the electrical contact portions include, for example, dripping of liquid from liquid connection portions at a time of attaching and detaching the liquid ejection head to and from the recording apparatus or mist generated when liquid such as ink is ejected. In these cases, there is an issue that an electrical circuit may be short-circuited and cause the liquid ejection head to break down.

Japanese Patent Application Laid-Open No. 2014-004767 discuses, as a method for addressing the above-described issue, a liquid ejection head including a cover member for covering electrical contact portions between a recording apparatus and a liquid ejection head. The cover member is also configured to be deformable so as to reduce a gap between the cover member and the electrical contact portions and thus suppresses infiltration of liquid into the electrical contact portions of the liquid ejection head.

The configuration discussed in Japanese Patent Application Laid-Open No. 2014-004767, however, can suppress infiltration of the liquid into the electrical contact portions, but the cover member cannot be opened and closed. Thus, there is a concern that the electrical contact portion cannot be easily attached and detached in a case where the liquid ejection head is attached to and detached from an ejection apparatus.

SUMMARY

The present disclosure is directed to the provision of a liquid ejection head that can suppress infiltration of liquid into electrical contact portions of the liquid ejection head and can be easily attached to and detached from an ejection apparatus.

According to an aspect of the present disclosure, a liquid ejection head includes an ejection element substrate configured to eject liquid to perform recording, an electrical contact portion configured to be electrically connected to an electrical wiring unit of an ejection apparatus to supply power to the ejection element substrate, a housing configured to include an opening portion into which the electrical wiring unit is inserted and to be provided with the electrical contact portion inside, and an opening/closing member configured to open and close the opening portion, wherein, in a closed state in which the opening/closing member closes the opening portion, the electrical wiring unit is sandwiched between the opening/closing member and a part of the housing.

Further features of the present disclosure will become apparent from the following description of exemplary embodiments with reference to the attached drawings.

DESCRIPTION OF THE EMBODIMENTS

Figure 1:
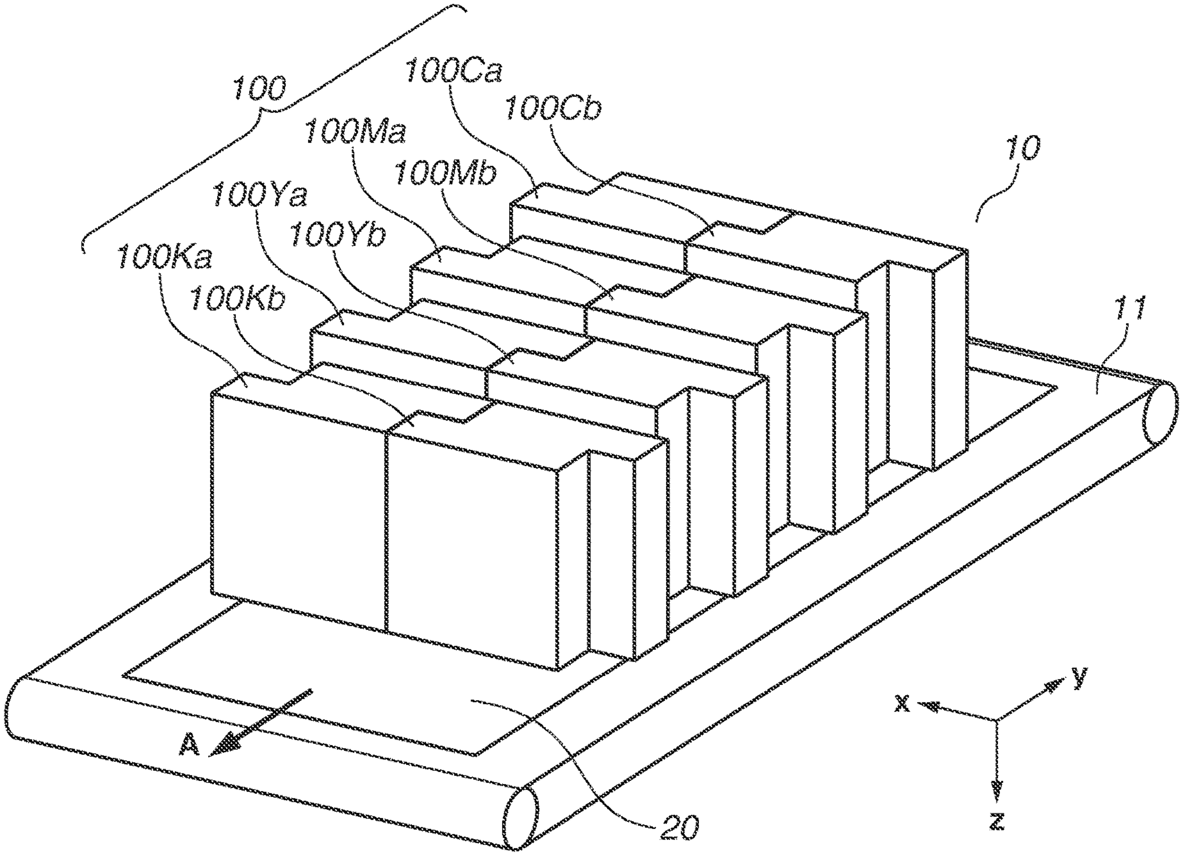
FIG. 1 is a perspective view of an ejection apparatus.

Exemplary embodiments of the present disclosure will be described below with reference to the attached drawings. The following exemplary embodiments are not meant to limit the scope of the present disclosure and, not all combinations of features described in the present exemplary embodiment are essential. The same reference numerals are used for the same components.

According to a first exemplary embodiment, a method is described in which liquid is ejected by using a piezoelectric element that generates pressure by applying voltage. The present disclosure can be applied to a liquid ejection head that adopts a thermal method for ejecting liquid using a thermoelectric conversion element and other various liquid ejection methods.

According to the present exemplary embodiment, a liquid ejection head to be used in an ink jet recording apparatus that ejects ink is described. However, liquid to be ejected is not limited to ink. In other words, the present disclosure can be applied to a liquid ejection head that is used in an ejection apparatus. The present disclosure is applied to an ink jet recording apparatus that has a form of circulating liquid, such as ink, between a tank and a liquid ejection head, but other forms can also be used. For example, a form can be used in which two tanks are provided on an upstream side and a downstream side of a liquid ejection head, and ink in a pressure chamber flows from one tank to the other without circulating the ink.

FIG. 1 is a perspective view of a recording apparatus 10 according to the present exemplary embodiment. The recording apparatus 10 according to the present exemplary embodiment is a one-pass type inkjet recording apparatus that records an image or the like by moving a printing medium 20 with respect to a liquid ejection head 100 that is arranged over an entire width of the printing medium 20 to eject liquid. The printing medium 20 is conveyed by a conveyance unit 11 in a direction of an arrow A, and recording is performed thereon by the liquid ejection head 100. The liquid ejection head 100 of the ink jet recording apparatus according to the present exemplary embodiment is composed of two liquid ejection heads in two rows a and b for each of cyan (liquid ejection heads 100Ca and 100Cb), magenta (liquid ejection heads 100Ma and 100Mb), yellow (liquid ejection heads 100Ya and 100Yb), and black (liquid ejection heads 100Ka and 100Kb). Arrangement and the number of the liquid ejection heads 100 are not limited to this.

Figure 2:
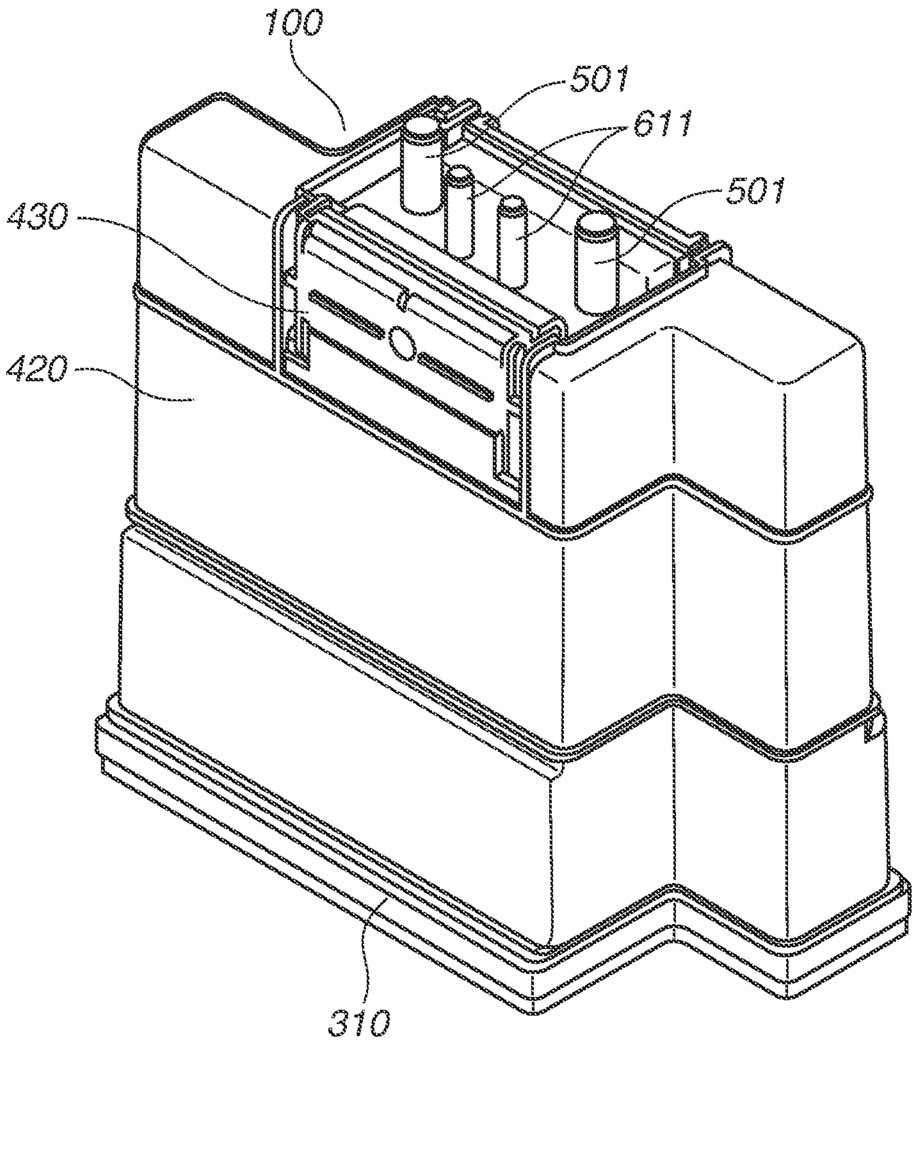
FIG. 2 is a perspective view of a liquid ejection head.
Figure 3:
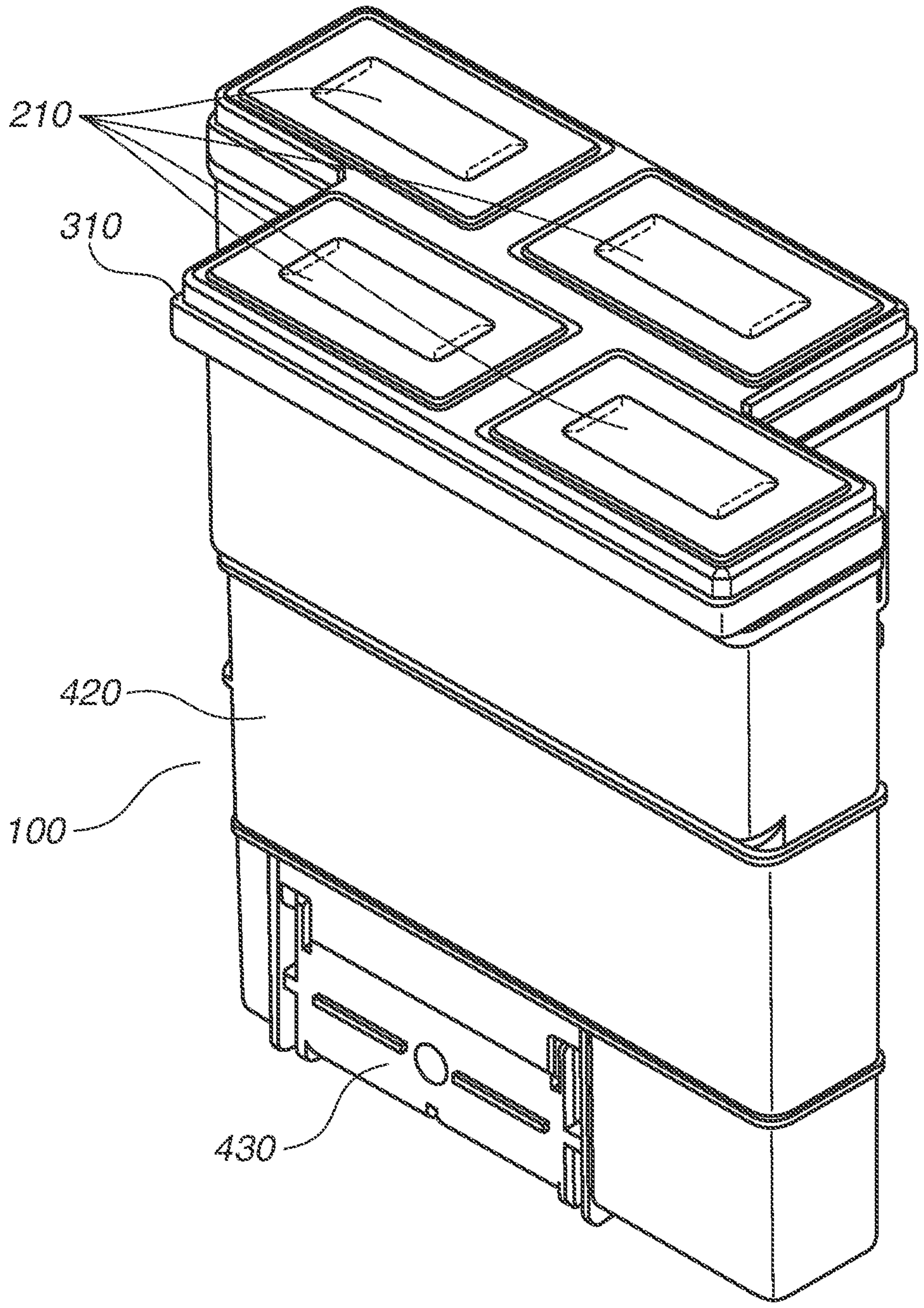
FIG. 3 is a perspective view of the liquid ejection head.
Figure 4:
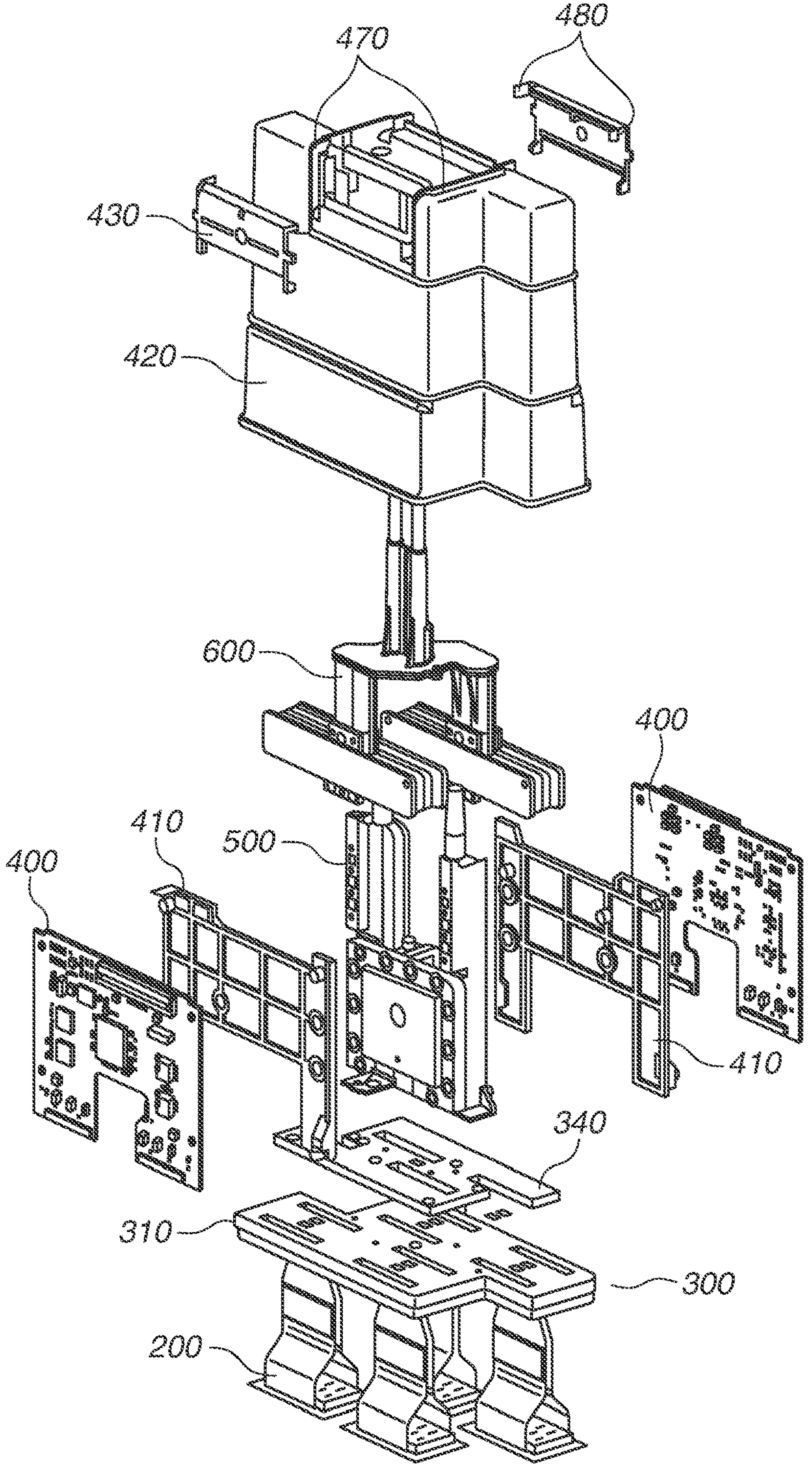
FIG. 4 is an exploded perspective view of the liquid ejection head.

A configuration of the liquid ejection head 100 according to the present exemplary embodiment will now be described. FIGS. 2 and 3 are perspective views and FIG. 4 is an exploded perspective view of the liquid ejection head 100 according to the present exemplary embodiment. In the liquid ejection head 100 according to the present exemplary embodiment, four recording element substrates 210, which are ejection element substrates capable of ejecting liquid, are arranged in a staggered pattern on a support member 310. The number of recording element substrates 210 is not limited to four. The recording element substrate 210 does not have to be arranged in the staggered pattern. Approximately at the center of an upper end of a housing 420 of the liquid ejection head 100, an ink connection portion 501 and a refrigerant connection portion 611, which are liquid connection portions, are provided. The ink connection portion 501 and the refrigerant connection portion 611 are respectively connected to an ink supply unit and a refrigerant supply unit on a side of the recording apparatus 10, so that liquid, such as ink and refrigerant, are supplied into the liquid ejection head 100. A liquid ejection head exterior unit includes a housing 420 that covers an ejection unit 200 that ejects liquid.

The housing 420 further includes opening/closing members 430 that cover an electrical contact portion 402 electrically connected to an electrical wiring unit 12 (FIG. 21) of the ink jet recording apparatus. According to the present exemplary embodiment, two each of the electrical contact portions 402 and the opening/closing members 430 are provided for one liquid ejection head 100. However, the present disclosure is not limited to this configuration. In a case where at least two electrical contact portions 402 and two opening/closing members 430 are provided, it is desirable that the at least two opening/closing members 430 face each other so as to sandwich the liquid connection portion therebetween. Accordingly, in FIG. 21, this arrangement can suppress both the opening/closing members 430 on a left side of a paper surface and the opening/closing members 430 on a right side of the paper surface from being soiled by liquid. The reasons is that, if liquid leaks from the ink connection portion 501 to an area illustrated in the left side of the paper surface, there is a possibility that the liquid will adhere to the opening/closing member 430 on the left side of the paper surface, but the opening/closing member 430 on the right side of the paper surface is on the opposite side, and thus there is a low possibility that the liquid will adhere to the opening/closing member 430 on the right side.

The liquid ejection head 100 includes a support unit 300 that includes the support member 310, electrical relay boards 400, and electrical relay board support members 410 that hold the electrical relay boards 400. In other words, the electrical relay boards 400 are arranged inside the housing 420. The liquid ejection head 100 further includes a liquid supply unit 500 that supplies liquid to the ejection unit 200 via the support unit 300, and a cooling unit 600 that cools a drive circuit. The support member 310 is arranged between the ejection unit 200 and the housing 420. A structure of each part of the liquid ejection head 100 is described in detail below.

Figure 5:
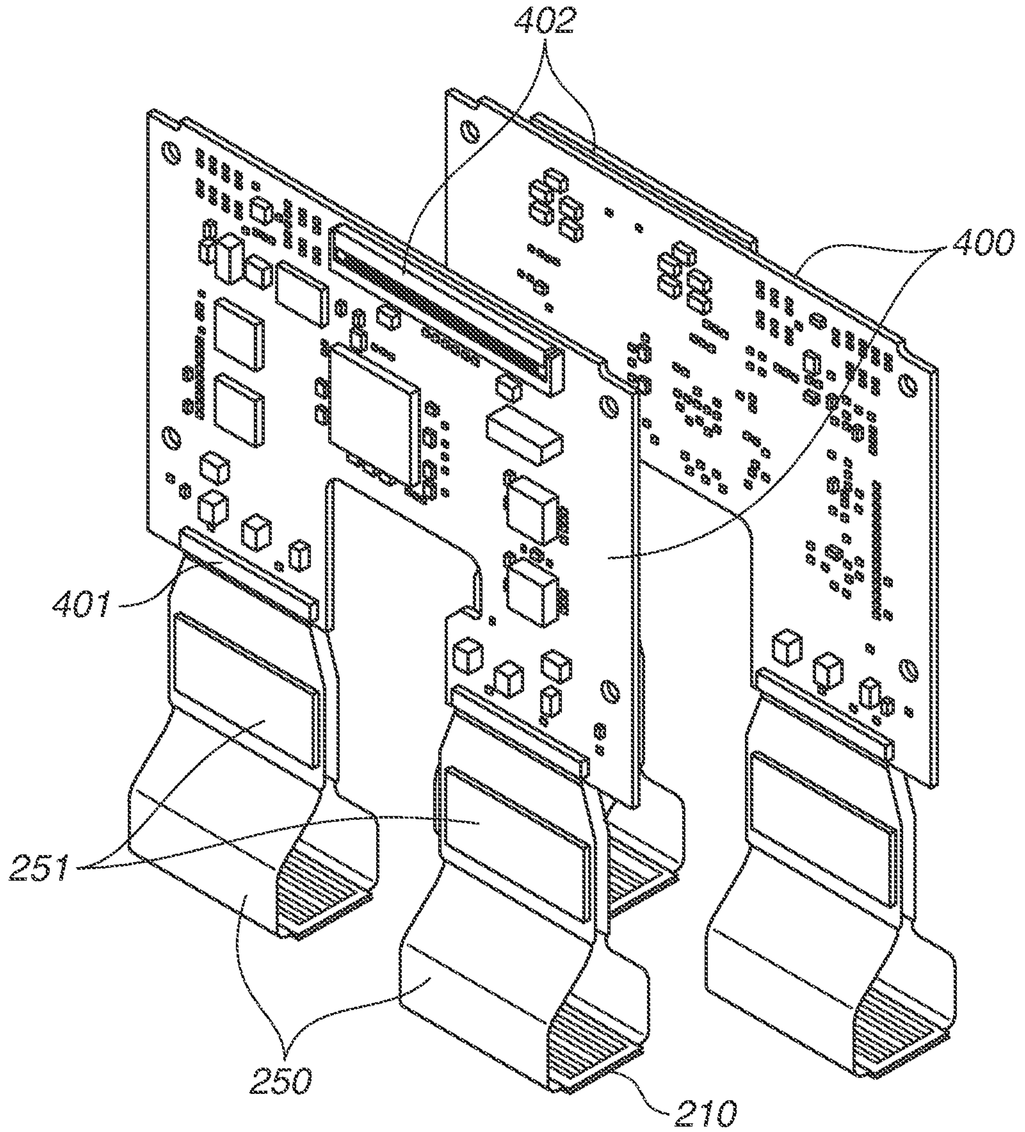
FIG. 5 is a perspective view illustrating an electrical connection configuration of the liquid ejection head.

FIG. 5 is a perspective view illustrating an electrical connection configuration of the liquid ejection head 100 according to the present exemplary embodiment. The liquid ejection head 100 includes, as the electrical connection configuration, the electrical contact portions 402, the electrical relay boards 400, electrical contact portions 401, and flexible wiring boards 250. The recording apparatus 10 and the liquid ejection head 100 are electrically connected by connecting the electrical wiring unit 12 (FIG. 21) and the electrical relay boards 400 with the electrical contact portions 402. The electrical relay boards 400 supply (relay) electricity supplied from the recording apparatus 10 to the flexible wiring boards 250 via the electrical contact portions 401. The electricity supplied to the flexible wiring boards 250 is supplied to the recording element substrates 210 via an electrode portion 212 (FIG. 9), which will be described below. In this way, an ejection drive signal and power used for ejecting liquid from the liquid ejection head 100 are supplied from the recording apparatus 10 to the liquid ejection head 100. In other words, the electricity is supplied from the recording apparatus 10 to the ejection unit 200 via the electrical contact portions 402. Wiring is consolidated by an electric circuit in the electrical relay board 400, and thus the number of terminals of the electrical contact portion 402 can be reduced compared with the number of terminals of the recording element substrate 210. Accordingly, the number of electrical contact portions required for attaching and detaching the liquid ejection head 100 to and from the recording apparatus 10 can be reduced. It is desirable that the electrical contact portion 402 is formed at an end of the electrical relay board 400.

Figure 6:
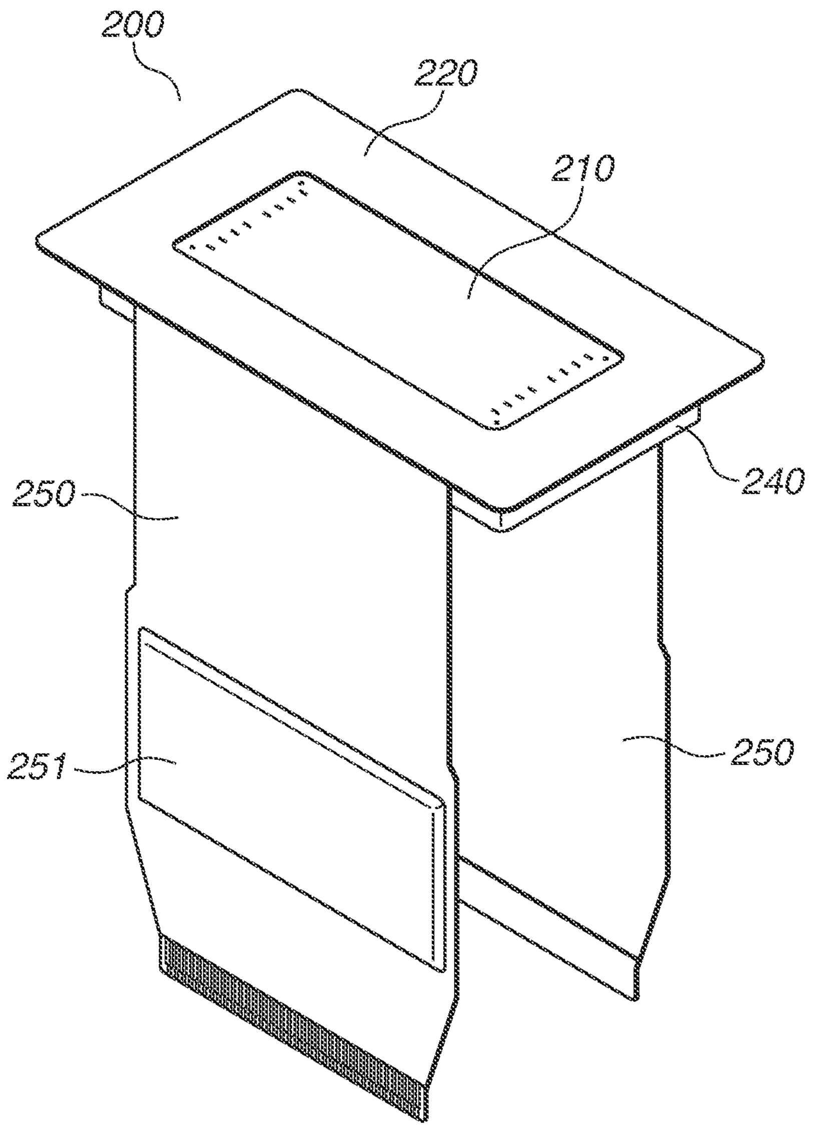
FIG. 6 is a perspective view of an ejection unit.
Figure 7:
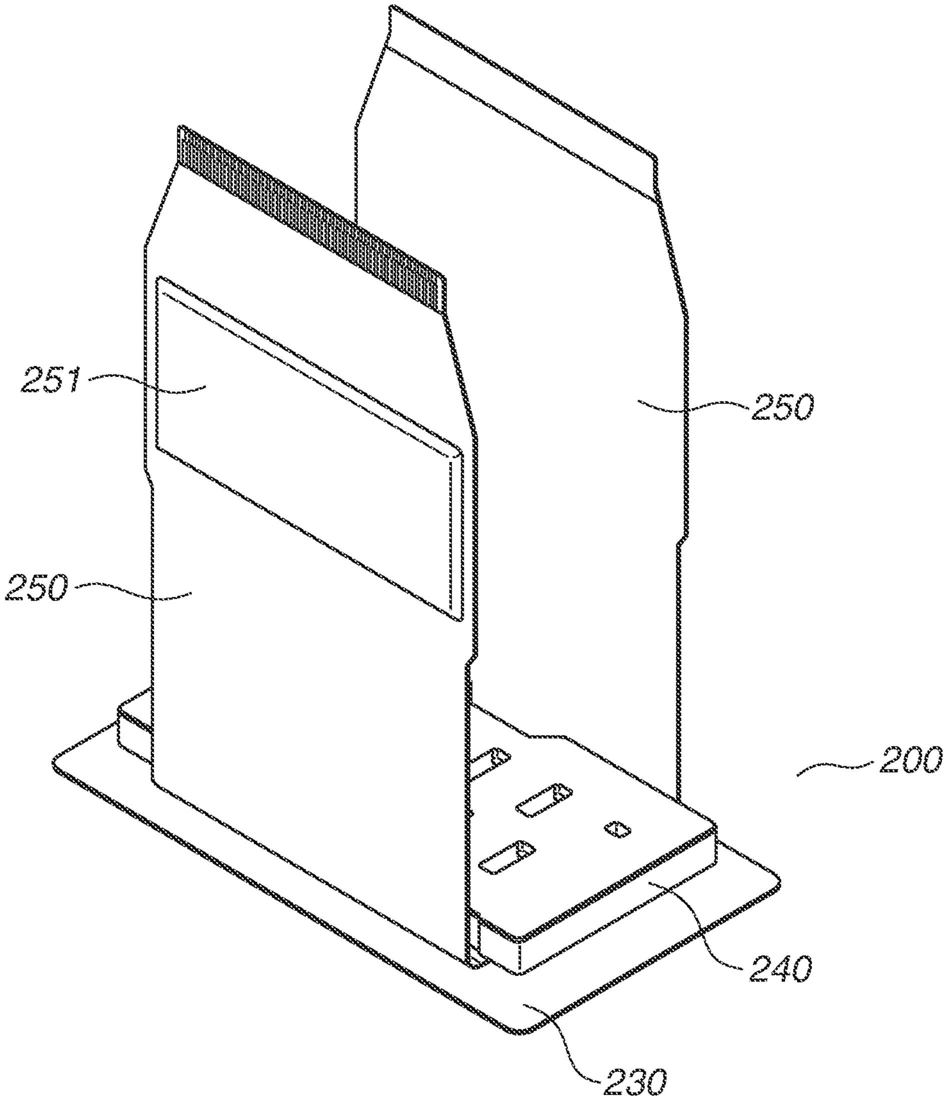
FIG. 7 is a perspective view of the ejection unit.
Figure 8:
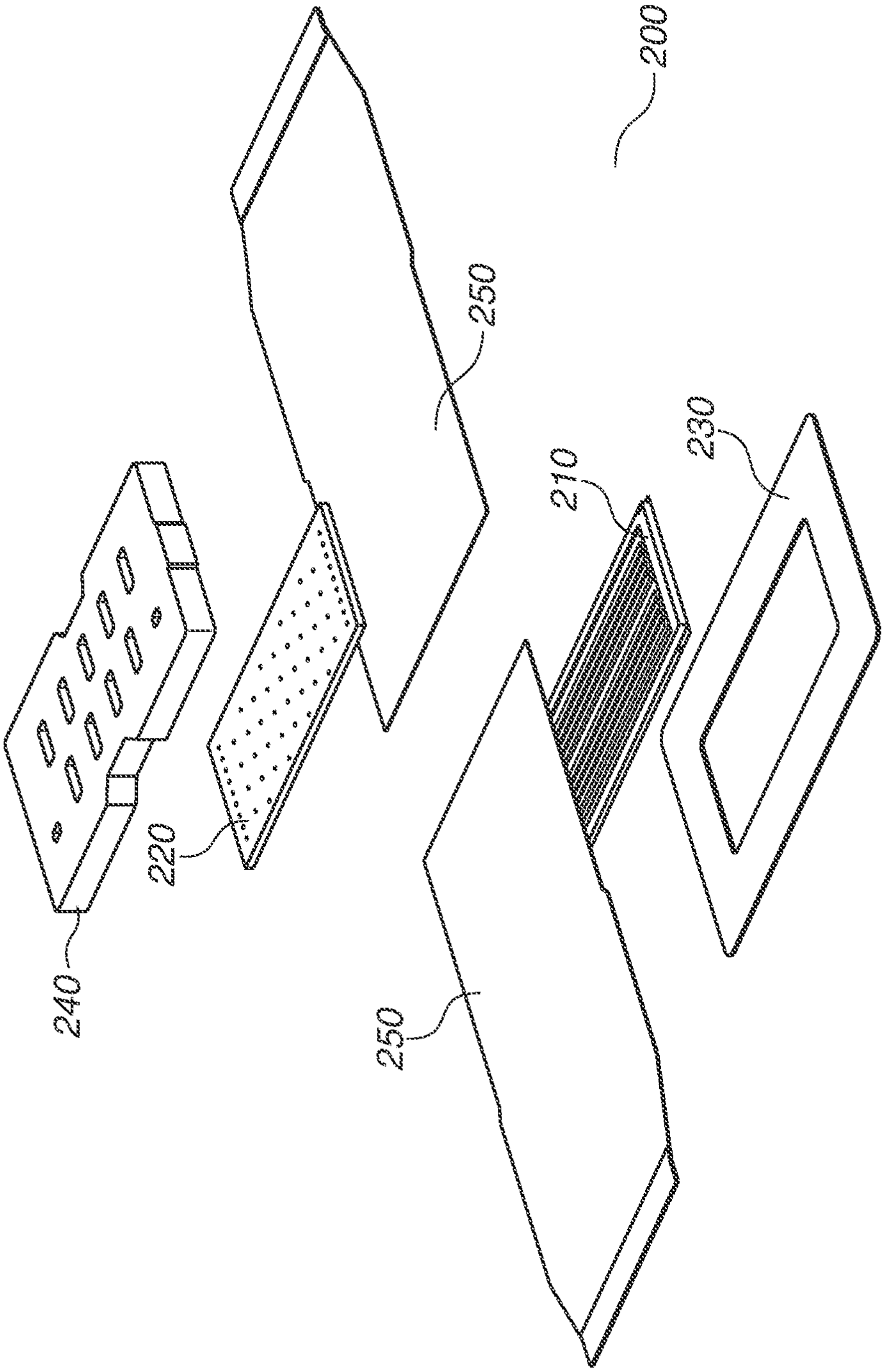
FIG. 8 is an exploded perspective view of the ejection unit.

FIGS. 6 and 7 are perspective views and FIG. 8 is an exploded perspective view of the ejection unit 200. The ejection unit 200 includes the recording element substrate 210 provided with a pressure generation element that generates pressure for ejecting liquid. The ejection unit 200 further includes a recording element substrate flow path member 220 for supplying liquid to the recording element substrate 210, a flow path member 240, and a recording element substrate support member 230 joined to an ejection surface side of the recording element substrate 210. As a pressure generation element, it is desirable to include a piezoelectric element that is driven by application of voltage. A piezoelectric element typically has a longer service life than a thermoelectric conversion element, which is a thermal type pressure generation element, and the number of times of replacing the liquid ejection head 100 tends to be large in a piezoelectric type recording apparatus. Thus, the present disclosure is suitable for the piezoelectric type recording apparatus.

Figure 9:
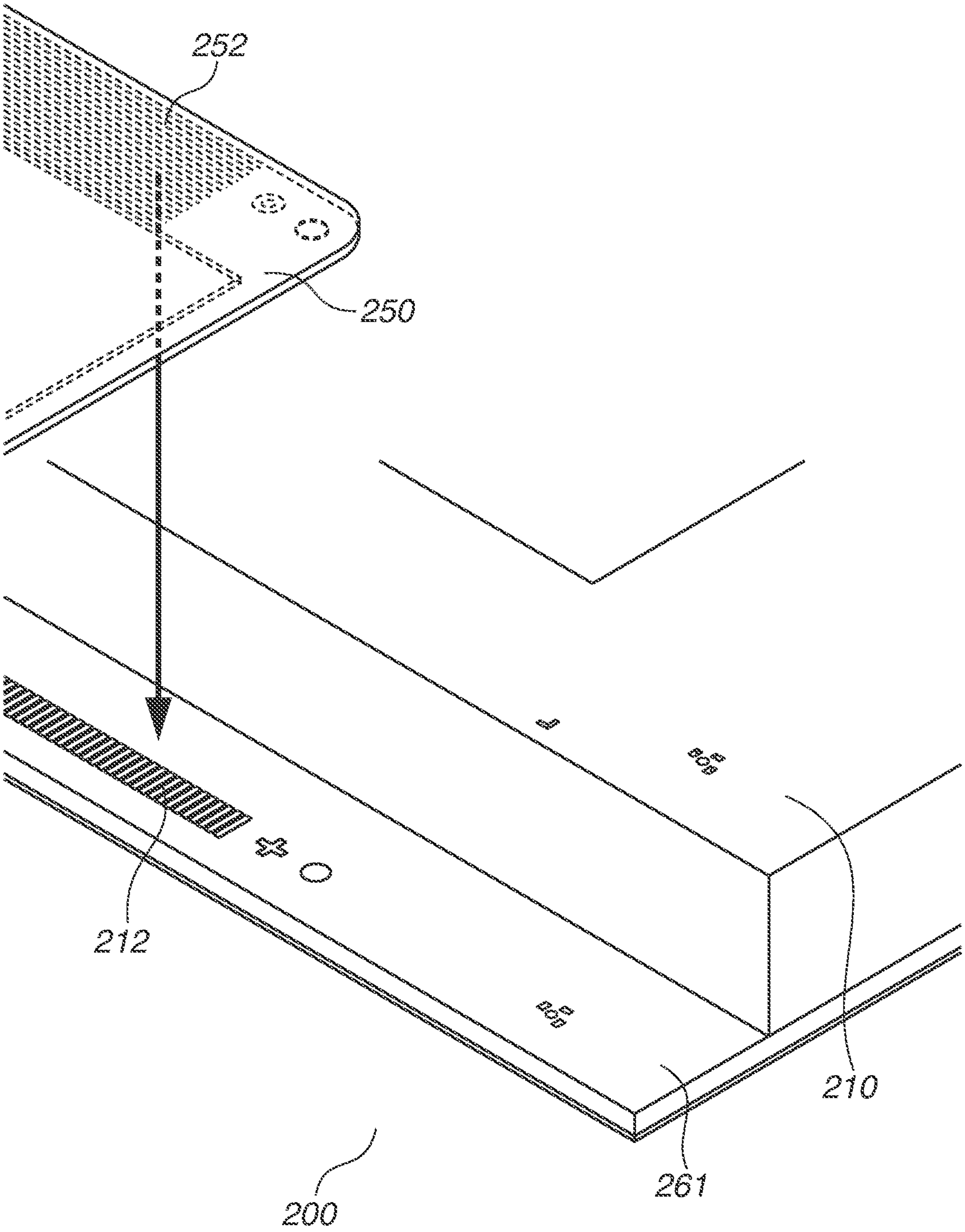
FIG. 9 is an enlarged view of an electrode portion of the ejection unit.

FIG. 9 is an enlarged view of the electrode portion 212 of the ejection unit 200. As illustrated in FIG. 9, the electrode portions 212 are provided on thin plate portions 261 at both ends of the recording element substrate 210. A first electrical contact portion 252 of the flexible wiring board 250 is brought into contact with the electrode portion 212, and thus the recording element substrate 210 is electrically connected and to the flexible wiring board 250. In order to prevent infiltration of liquid into the first electrical contact portion 252 and to reinforce the thin plate portion 261 of the recording element substrate 210, the recording element substrate support member 230 is joined to the ejection surface side of the thin plate portion 261. The flexible wiring board 250 includes a drive circuit board 251 for driving recording elements of the recording element substrate 210.

Figure 10:
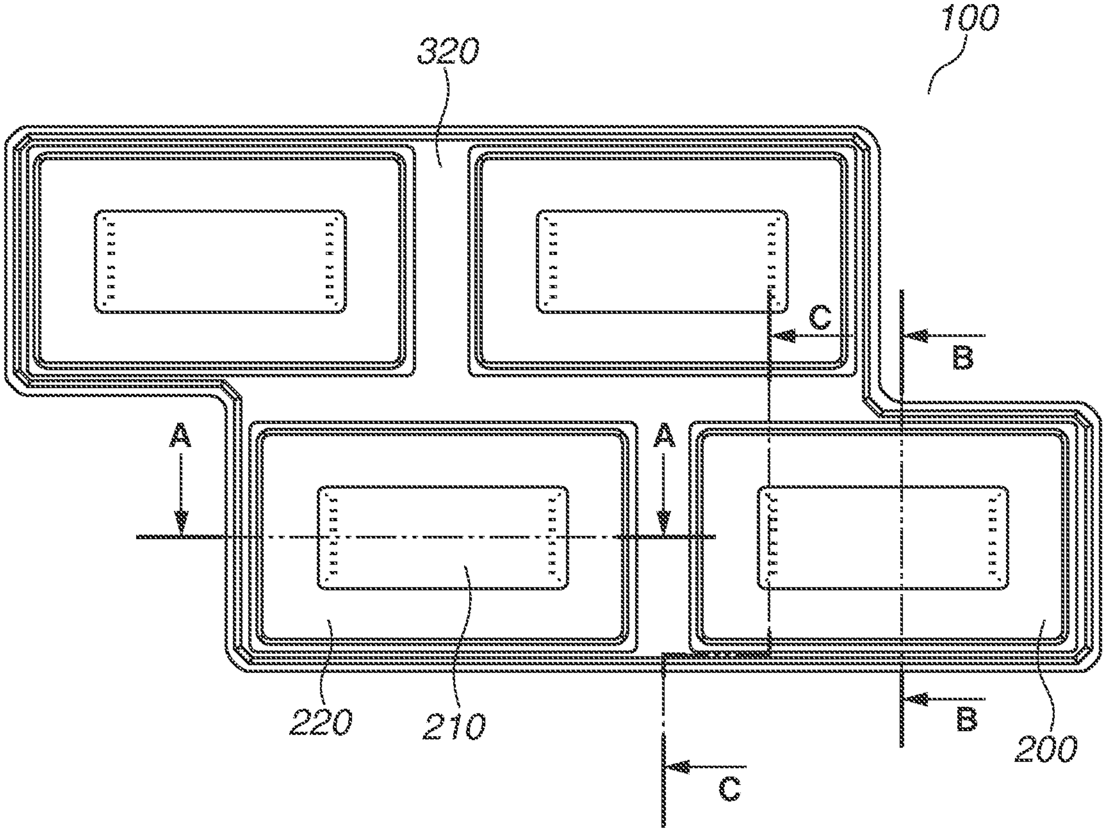
FIG. 10 is a plan view of the liquid ejection head viewed from a surface of the ejection unit.
Figure 11:
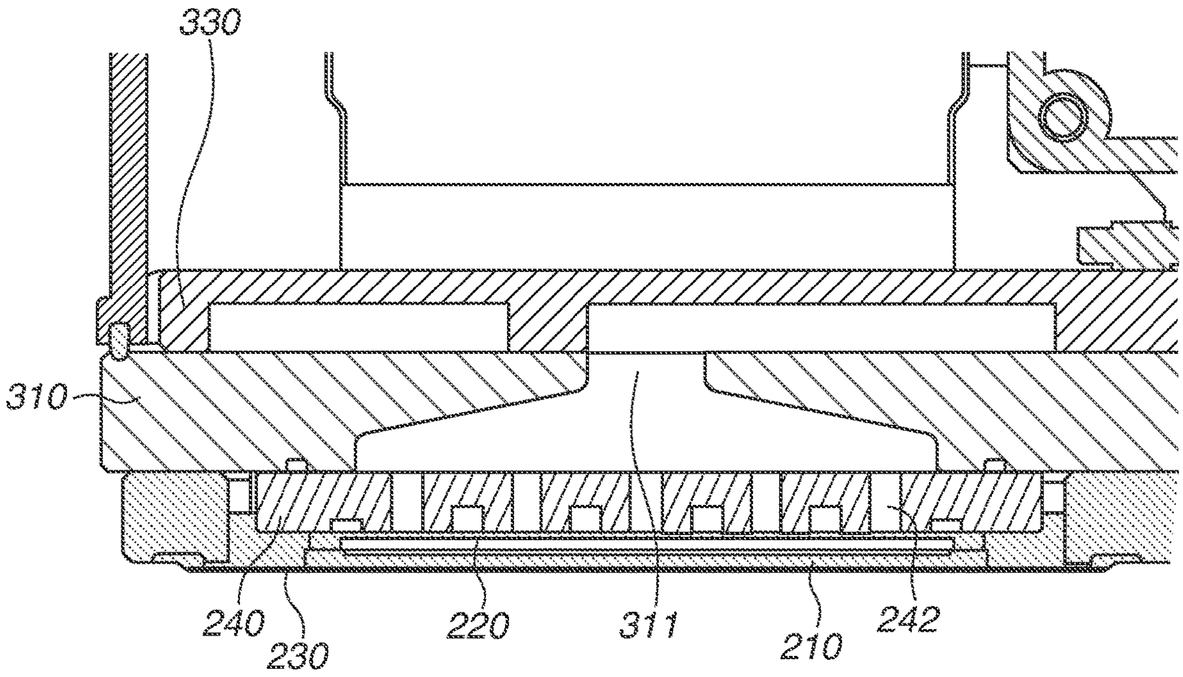
FIG. 11 is a cross-sectional view of the liquid ejection head taken along a line A-A.
Figure 12:
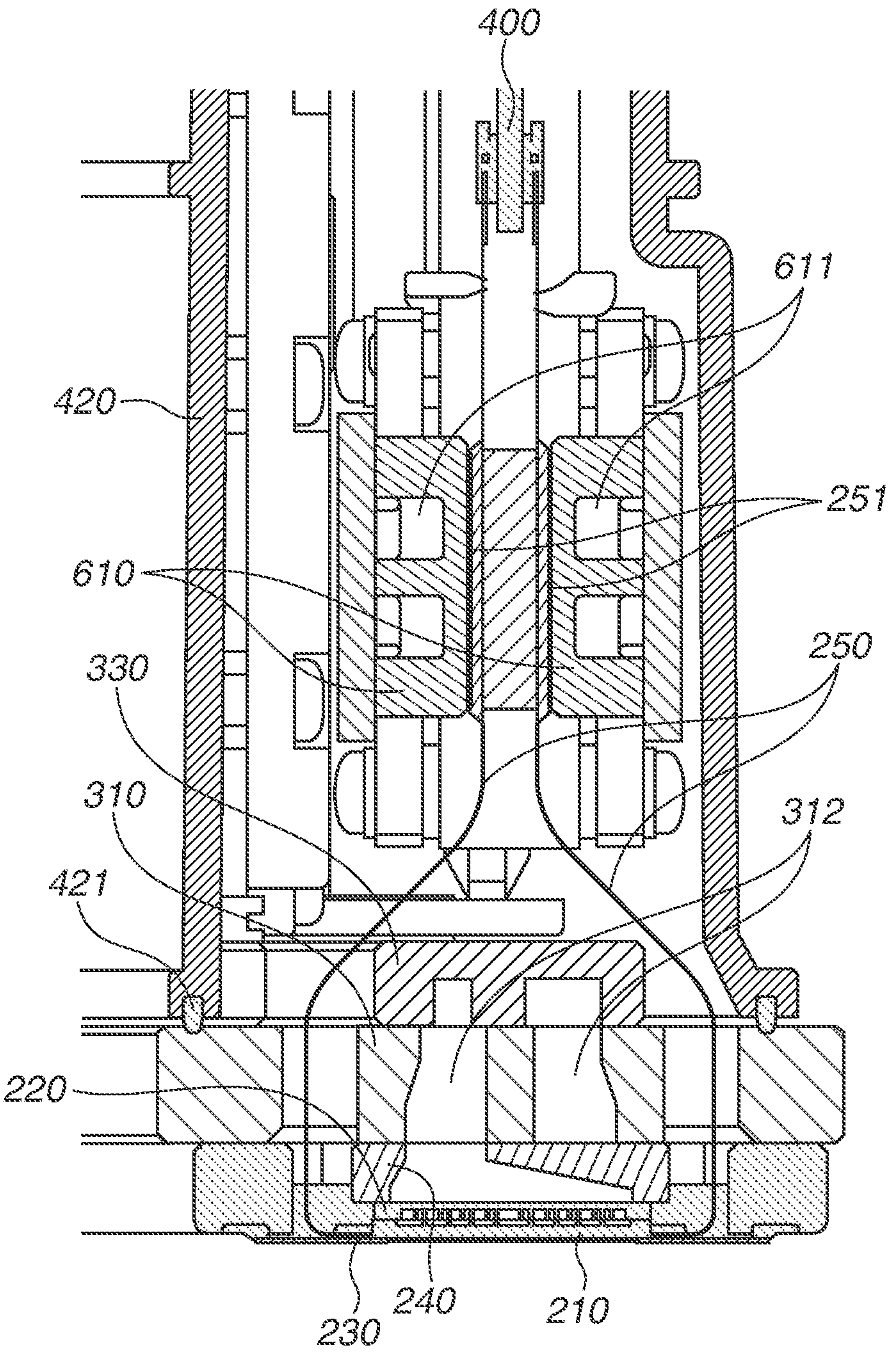
FIG. 12 is a cross-sectional view of the liquid ejection head taken along a line B-B.
Figure 13:
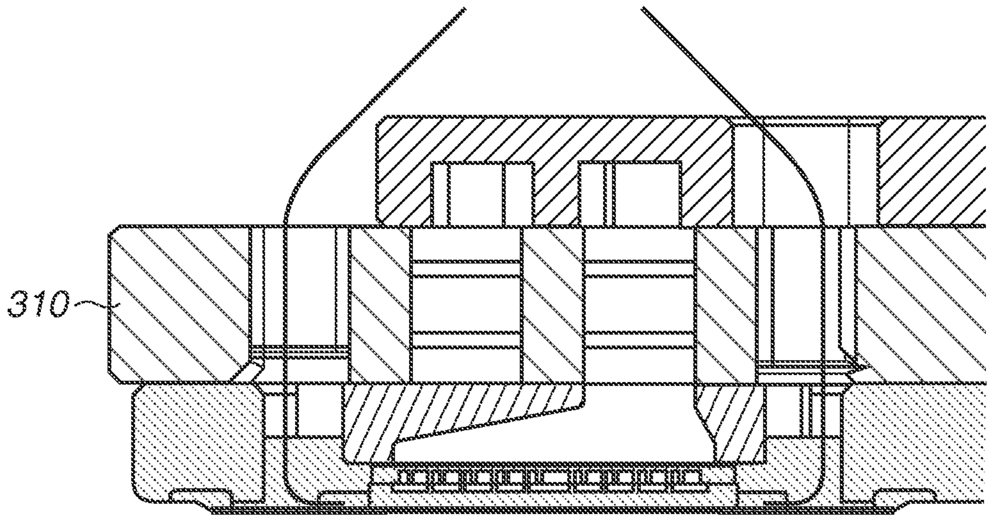
FIG. 13 is a cross-sectional view of the liquid ejection head taken along a line C-C.

FIG. 10 is a plan view of the liquid ejection head 100 viewed from a surface of the ejection unit 200. FIGS. 11, 12, and 13 are cross-sectional views of the liquid ejection head 100 according to the present exemplary embodiment respectively taken along a line A-A, a line B-B, and a line C-C, respectively. The ejection unit 200 is surrounded by a frame body member 320. The housing 420 is connected above the support member 310, and the liquid supplied from the housing 420 is supplied to a plurality of liquid paths 242 via a support member path 311. The housing 420 also includes a sealing member 421 that can seal a gap, between the housing 420 and the support member 310. With this configuration, it is possible to suppress, for example, liquid from dripping from the ink connection portion 501 and the refrigerant connection portion 611 at a time of attaching and detaching the liquid ejection head 100 to and from the recording apparatus 10, and infiltration of liquid into the liquid ejection head 100 due to mist at the time of ejecting liquid such as ink. As a material for the sealing member 421, an elastomer or the like can be suitably used.

A method for forming the sealing member 421 with respect to the housing 420 includes, for example, two-color molding (joining) and bonding methods. In a case where the housing 420 and the sealing member 421 are molded by two-color molding (joining), difficulty of molding the housing 420 increases, but the number of parts and mounting processes for configuring the liquid ejection head 100 can be reduced. In contrast, in a case where the housing 420 and the sealing member 421 are bonded, the number of parts and the mounting processes for configuring the liquid ejection head 100 are increased, but the sealing member 421 can be manufactured more easily compared with the two-color molding method.

Figure 14:
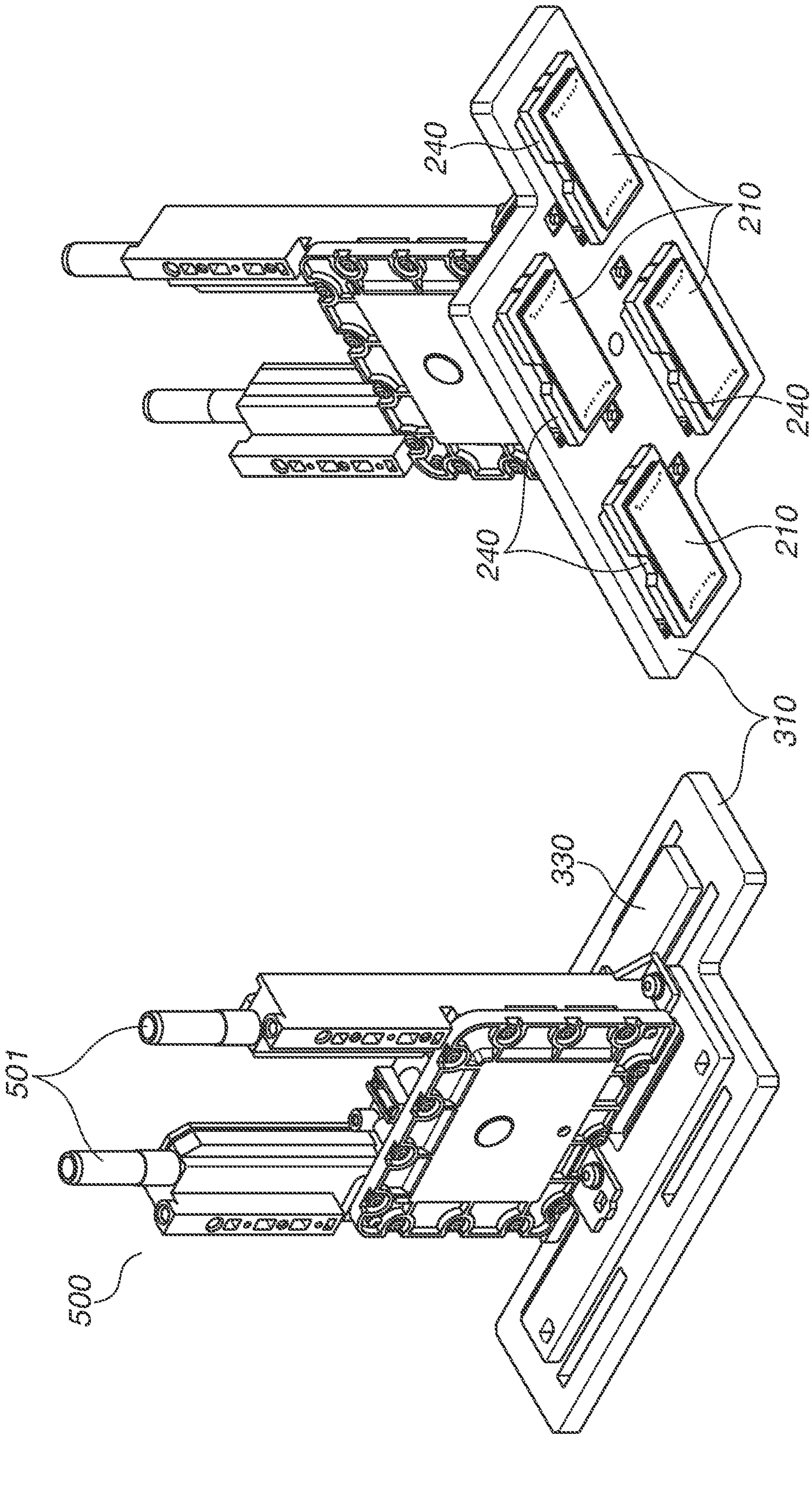
FIG. 14 is perspective views illustrating a liquid connection configuration of the liquid ejection head.

FIG. 14 is a perspective view illustrating a liquid connection configuration of the liquid ejection head 100 according to the present exemplary embodiment. The liquid supply unit 500 includes ink connection portions 501 and is connected to a liquid supply system of the recording apparatus 10. Liquid is thereby supplied from the supply system of the recording apparatus 10 to the liquid ejection head 100, and liquid not ejected from the liquid ejection head 100 is collected into the supply system of the recording apparatus 10. In this way, liquid can be circulated between the recording apparatus 10 and the liquid ejection head 100. It is desirable that the liquid supply unit 500 is provided with a filter (not illustrated) communicating with each opening of the ink connection portion 501 to remove foreign matter from the supplied ink.

Figure 15:
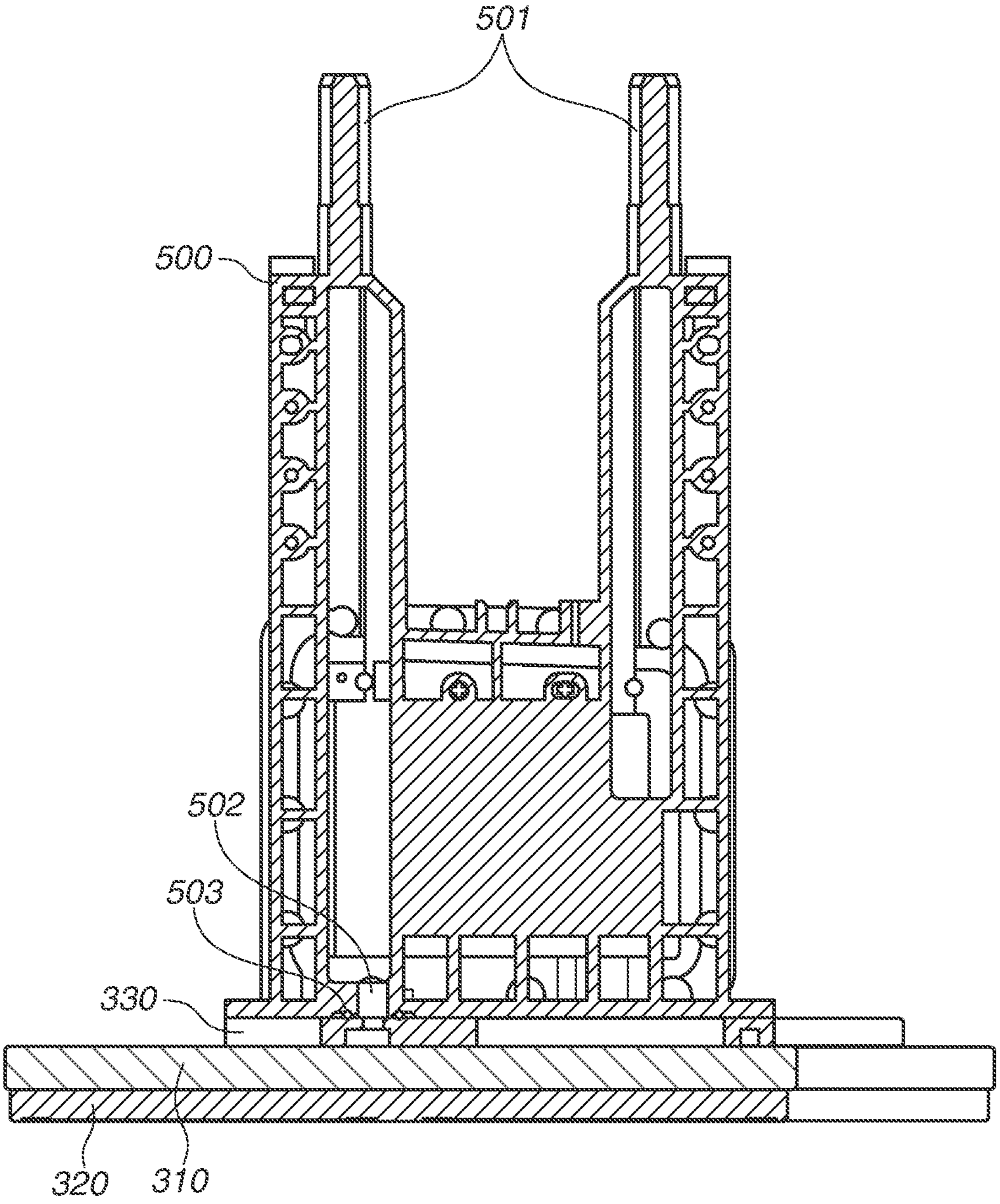
FIG. 15 is a cross-sectional view of a liquid connection portion between a liquid supply unit and a liquid supply member.
Figure 16:
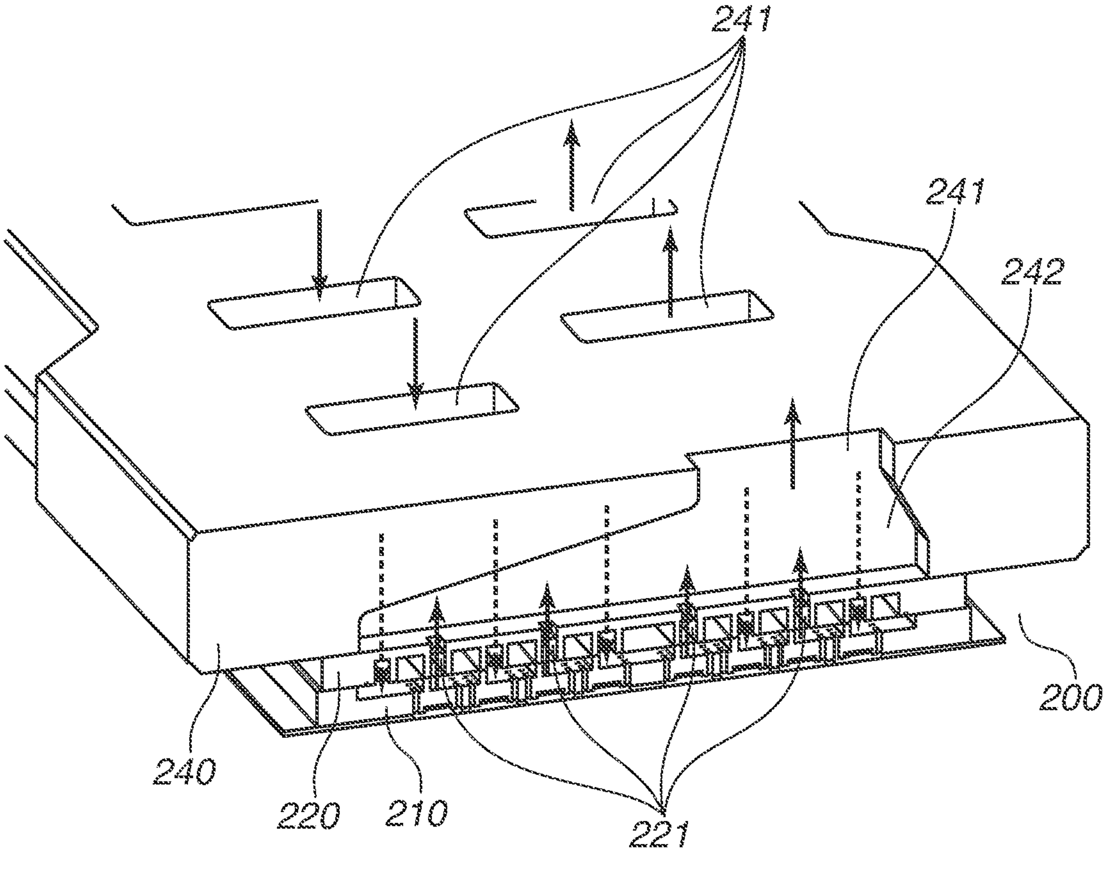
FIG. 16 is a cross-sectional view of a flow path of the ejection unit.

FIG. 15 is a cross-sectional view of the liquid connection portion between the liquid supply unit 500 and a liquid supply member 330. Liquid flowing into the liquid ejection head 100 from the recording apparatus 10 side through the ink connection portion 501 passes through a communication port 502 and the liquid is supplied to the liquid supply member 330. A space between the liquid supply unit 500 and the liquid supply member 330 is sealed by an elastic member 503.

The support member 310 and each ejection unit 200 are fluidly connected through a communication port 241 of the flow path member 240. A liquid flow path 242 is formed in the flow path member 240 and is fluidly connected to the recording element substrate flow path member 220 via a communication port 221.

Figure 17:
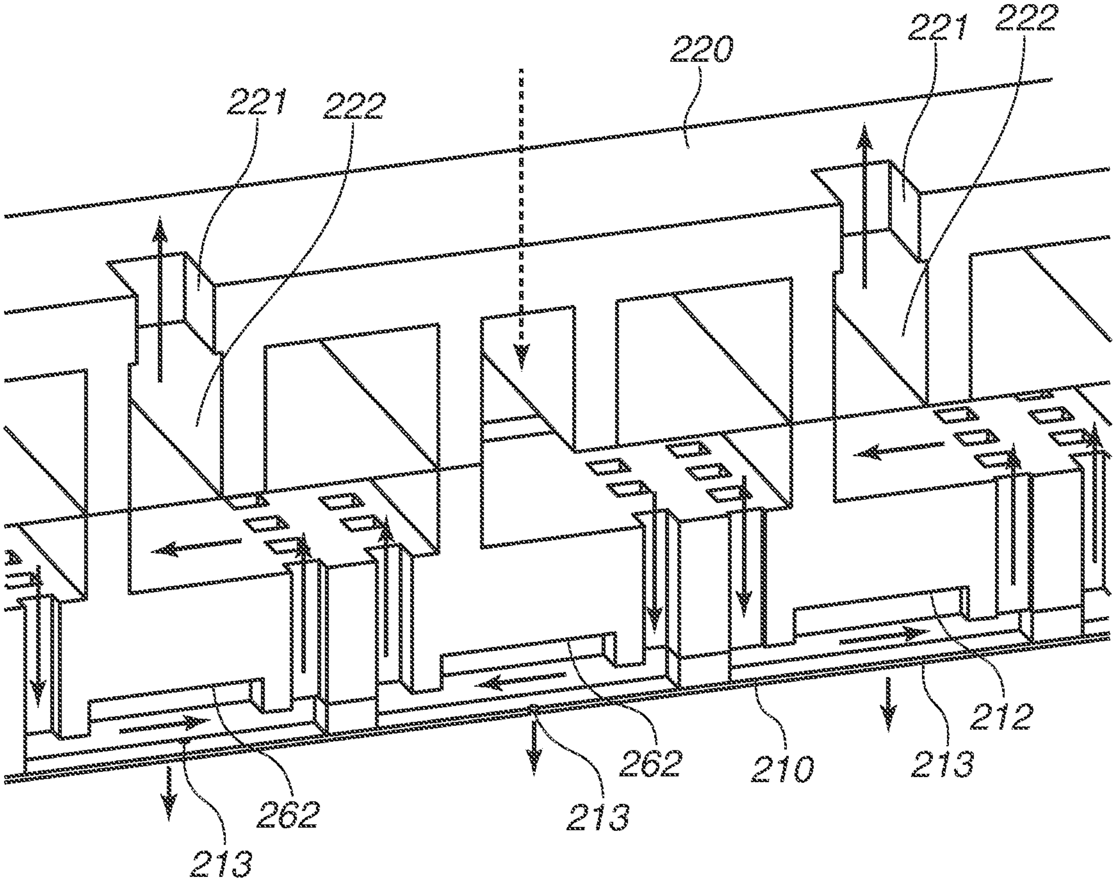
FIG. 17 is a cross-sectional view of a flow path in a recording element substrate.

FIG. 17 is a cross-sectional view of a flow path in the recording element substrate 210. The liquid flowing from each communication port 221 passes through a common flow path 222 and is supplied to the recording element substrate 210. The ejection unit 200 (the recording element substrate 210) includes a piezoelectric element 262 that is driven by application of voltage, and ejects the liquid from an ejection port 213 using pressure generated by driving the piezoelectric element 262. In the liquid ejection head 100 according to the present exemplary embodiment, liquid that is not ejected from the ejection port 213 passes through the common flow path 222 and the communication port 221 and the liquid is collected into the ink jet recording apparatus as described above.

Figure 18:
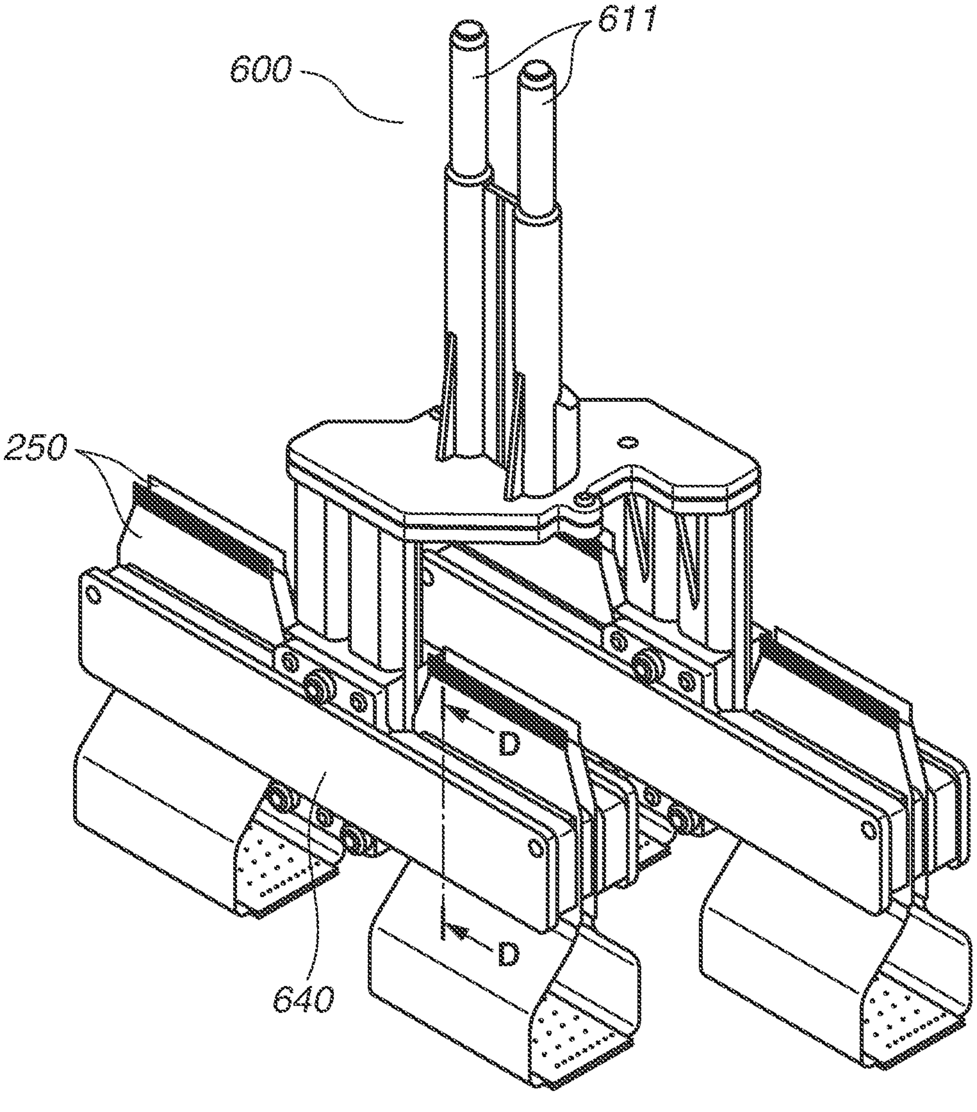
FIG. 18 is a perspective view of a cooling unit.
Figure 19:
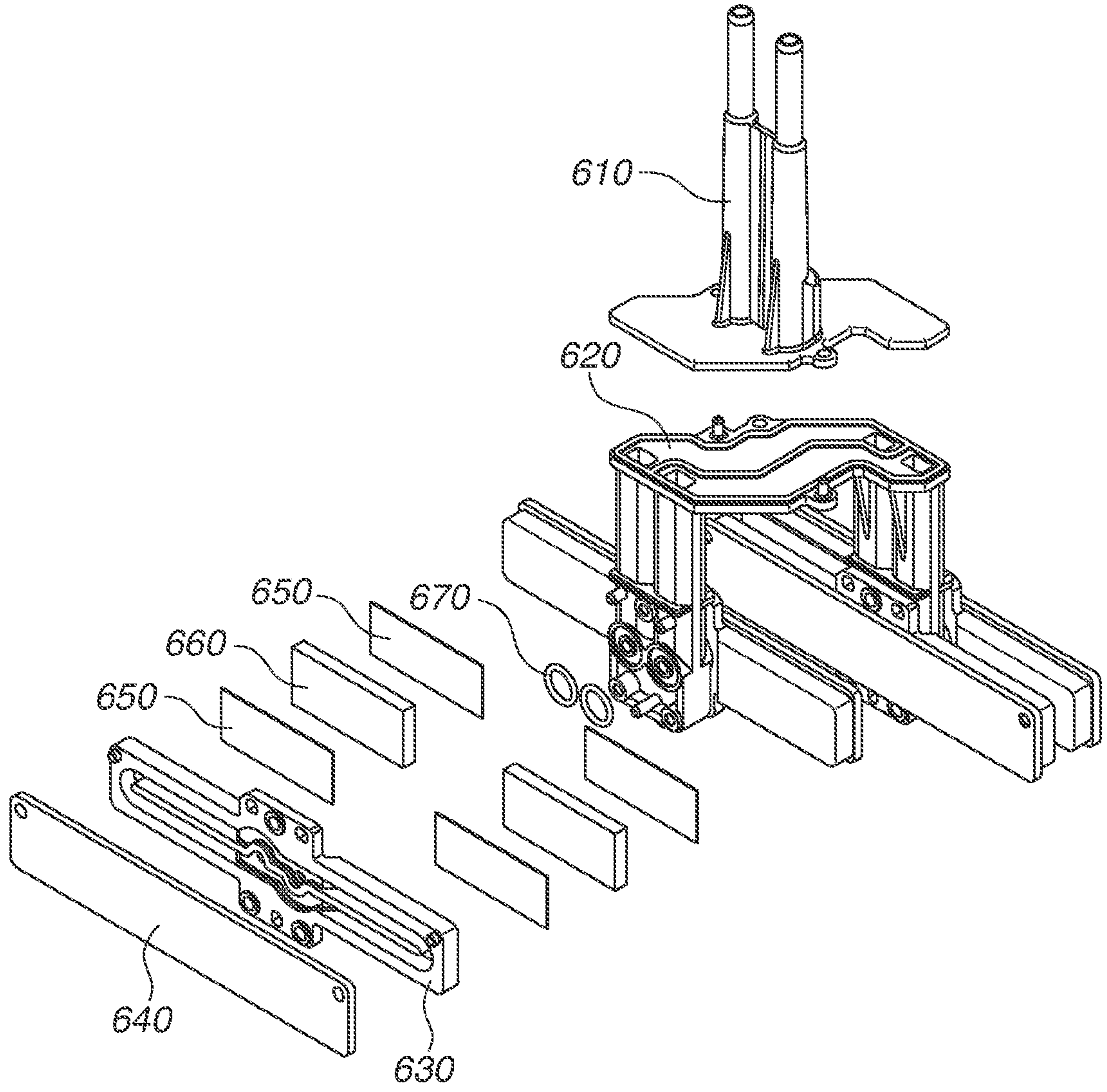
FIG. 19 is an exploded perspective view of the cooling unit.
Figure 20:
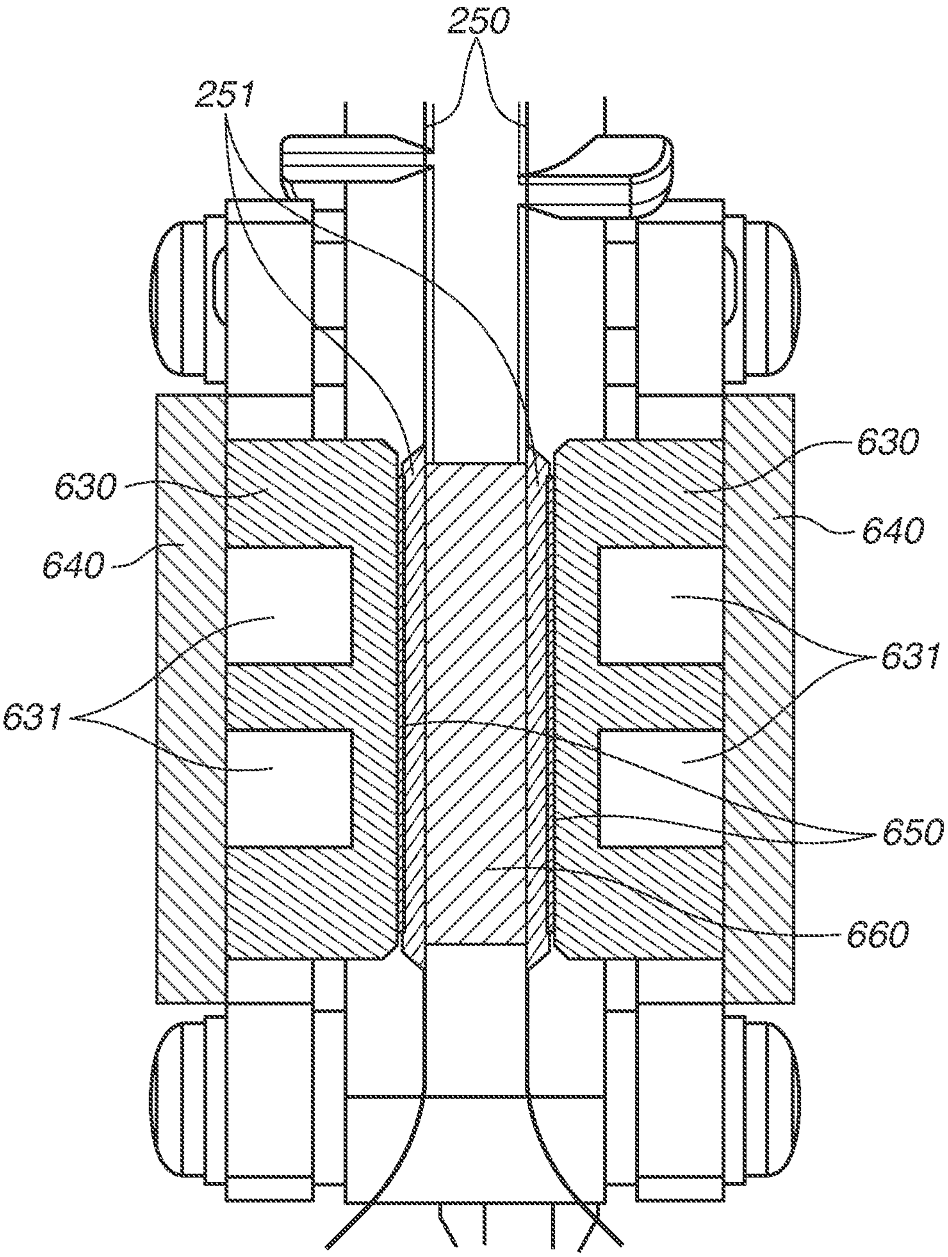
FIG. 20 is a cross-sectional view of the cooling unit taken along a line D-D.

FIGS. 18 and 19 are respectively a perspective view and an exploded perspective view of the cooling unit 600 for cooling the drive circuit board 251. FIG. 20 is a cross-sectional view of the cooling unit 600 taken along a D-D line. The cooling unit 600 includes the refrigerant connection portion 611 and is connected to a refrigerant supply system of the recording apparatus 10. The refrigerant is thereby supplied from the refrigerant supply system of the recording apparatus 10 to the cooling unit 600. The refrigerant having passed through refrigerant paths 631 included in the cooling unit 600 is collected to the refrigerant supply system of the recording apparatus 10. In this way, the refrigerant can be circulated between the recording apparatus 10 and the cooling unit 600. The refrigerant flowing from the refrigerant connection portion 611 branches at a refrigerant flow path formed between a first refrigerant supply member 610 and a second refrigerant supply member 620. The second refrigerant supply member 620 and a first cooling member 630 are fluidly connected via a seal member 670. The refrigerant branched in the second refrigerant supply member 620 then circulates in the refrigerant flow path formed between the first cooling member 630 and a second cooling member 640, and flows into the second refrigerant supply member 620 again. The first cooling member 630 is brought into contact with the drive circuit board 251 with a heat conductive member 650 in between, so that heat generated during an operation of the drive circuit board 251 is transferred to the refrigerant inside the first cooling member 630. An elastic member 660 is provided between two flexible wiring boards 250, and it is thereby possible to reliably bring the heat conductive member 650 into close contact with the drive circuit board 251. It is desirable for the first cooling member 630 to select a material with high thermal conductivity, such as aluminum, in order to easily transfer the heat generated by the drive circuit board 251.

Figure 21:
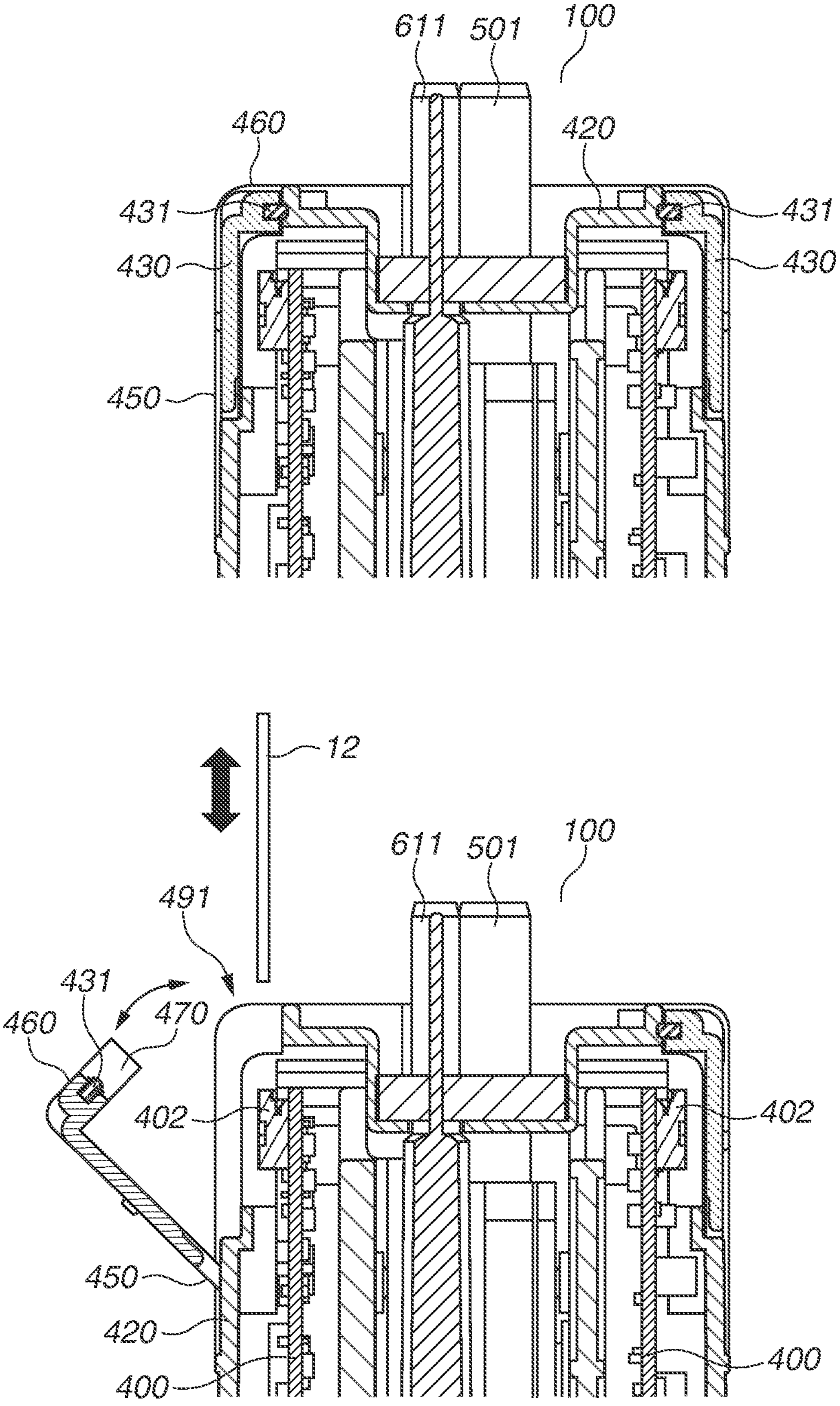
FIG. 21 is cross-sectional views of electrical contact portions between the ejection apparatus and the liquid ejection head.
Figure 22:
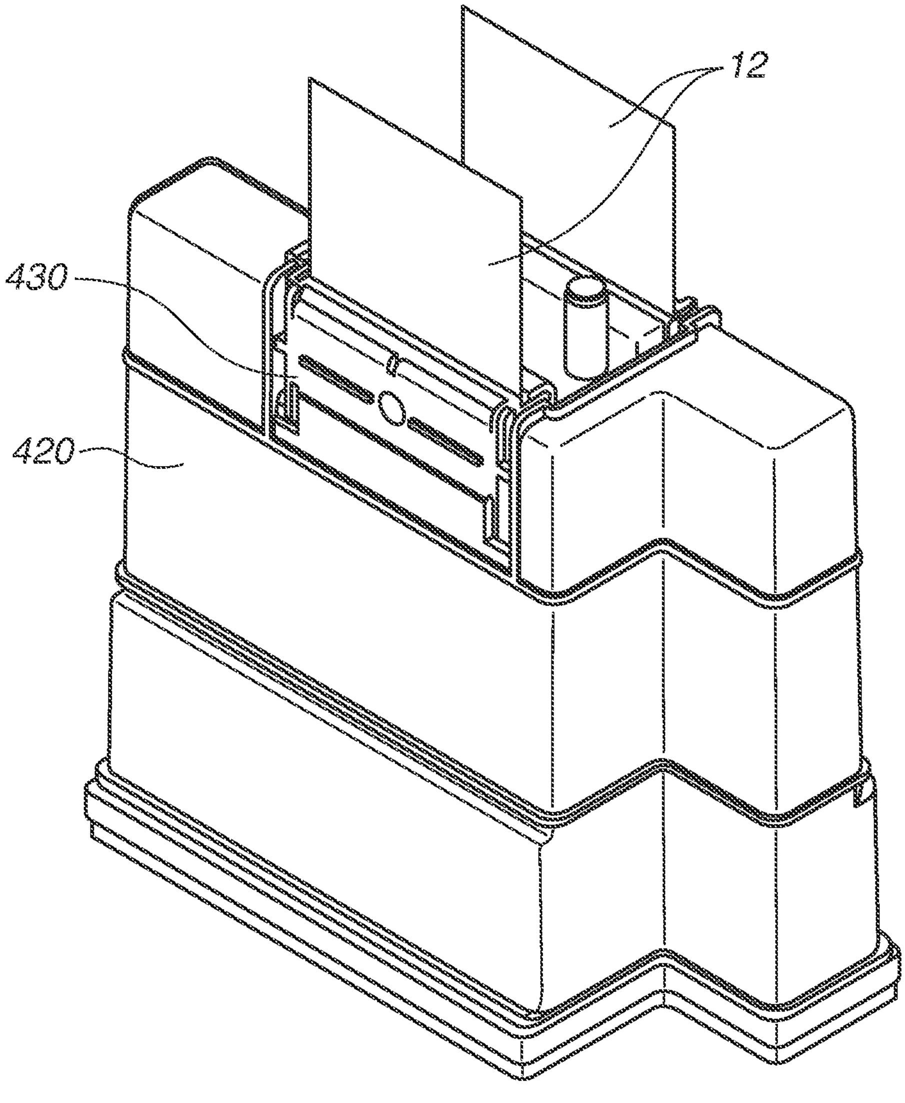
FIG. 22 is a perspective view of the liquid ejection head to which electrical wiring units are connected.
Figure 23:
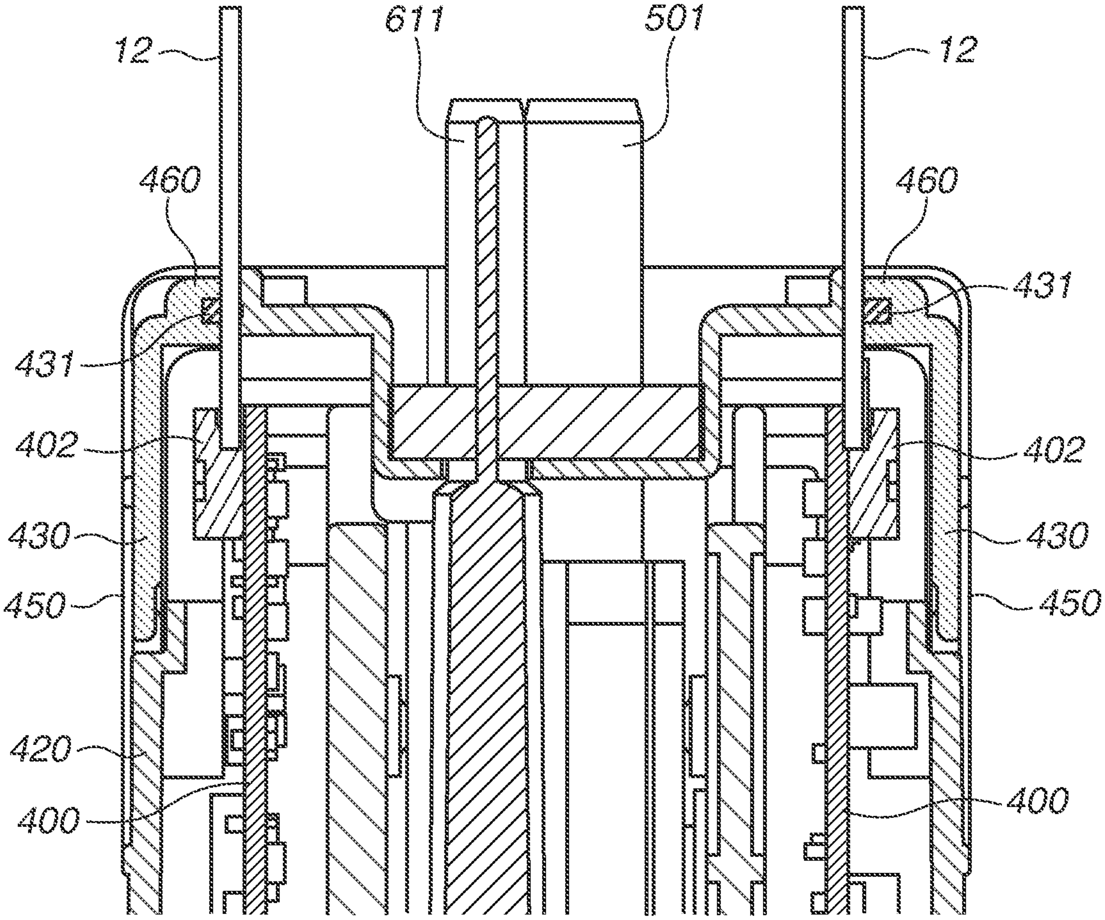
FIG. 23 is a perspective view of the liquid ejection head to which the electrical wiring units are connected.

The opening/closing member 430, which is a characteristic part of the present disclosure, will now be described in detail. FIG. 21 is cross-sectional views of the electrical contact portion between the recording apparatus 10 and the liquid ejection head 100. FIGS. 22 and 23 are respectively a perspective view and a cross-sectional view of the liquid ejection head to which the electrical wiring units 12 are connected. As described above, the liquid ejection head 100 includes the ink connection portion 501 and the refrigerant connection portion 611 approximately at the center of an upper end of the liquid ejection head 100. The ink connection portion 501 and the refrigerant connection portion 611 are respectively connected to the liquid supply unit and the refrigerant supply unit on the recording apparatus side, and liquid, such as ink and the refrigerant, are supplied into the liquid ejection head 100. In the liquid ejection head 100 according to the present exemplary embodiment, two each of the electrical contact portions 402 and the opening/closing members 430 are provided for one liquid ejection head 100 and are arranged to face each other so as to sandwich the liquid connection portion therebetween. A connection direction between the electrical contact portion 402 and the electrical wiring unit 12 is approximately the same direction as connection directions between the ink connection portion 501 and the liquid supply unit and between the refrigerant connection portion 611 and the refrigerant supply unit on the recording apparatus side, and is an approximately vertical direction in using the liquid ejection head 100. Here, in using the liquid ejection head 100 refers to an arrangement state of the liquid ejection head 100 in a state where the recording apparatus 10 can normally record an image, a character, and the like.

The housing 420 includes the opening/closing member 430 that covers the electrical contact portion 402. The electrical contact portion 402 is covered by the opening/closing member 430 (is in a closed state), and accordingly, for example, it is possible to suppress liquid from dripping from the liquid connection portion at the time of attaching and detaching the liquid ejection head to and from the recording apparatus and the infiltration of liquid into the electrical contact portion 402 due to mist at the time of ejecting liquid such as ink. In addition, the opening/closing member 430 is configured to be openable/closable with respect to the electrical contact portion 402. It is noted that the electrical contact portion 402 being covered by the opening/closing member 430 (being in the closed state) refers to a state in which an edge of an opening (an opening portion) into which the electrical wiring unit 12 is inserted is closed by the opening/closing member 430.

Specifically, the opening/closing member 430 includes a fixing portion 450 fixed to the housing 420 and an abutting unit 460 that abuts on the electrical wiring unit 12 of the recording apparatus 10, and has a rotation shaft for rotating using the fixing portion 450 as a starting point. The opening/closing member 430 has the rotation shaft and thus can rotate in a direction of a curved arrow illustrated in FIG. 21. In a case where the opening/closing members 430 are arranged to face each other to sandwich the liquid connection portion as illustrated in FIG. 21, the opening/closing members 430 can be opened and closed in opposite directions. With this configuration, the opening/closing member 430 protects the electrical contact portion 402 in using the recording apparatus 10, and the liquid ejection head 100 can be easily attached to and detached from the recording apparatus 10 at the time of attaching and detaching the liquid ejection head 100.

The opening/closing member 430 includes a protruding portion 480, and the housing 420 includes a concave portion 470 with which the protruding portion 480 engages. If the opening/closing member 430 is in a closed state with respect to the electrical contact portion 402, the protruding portion 480 thereby engages with the concave portion 470, so that the closed state can be maintained, and the infiltration of liquid into the electrical contact portion 402 can be further suppressed.

In a closed state in which an opening portion 491 is closed, the electrical wiring unit 12 is sandwiched between the opening/closing member 430 and a part of the housing 420. It is also desirable that the abutting unit 460 is formed with an elastic member 431 that seals around the electrical contact portion 402 in the closed state of the opening/closing member 430. With this configuration, sealing performance around the electrical contact portion 402 is improved, and the infiltration of liquid into the electrical contact portion 402 can be further suppressed. As a material of the elastic member 431, elastomer or the like can be suitably used. A method for forming the elastic member 431 with respect to the opening/closing member 430 includes, for example, the two-color molding (joining) and bonding methods. In a case of the two-color molding (joining), difficulty of molding the opening/closing member 430 increases, but the number of parts or the mounting processes for configuring the liquid ejection head 100 can be reduced. In contrast, in a case of bonding, the number of parts and the mounting processes for configuring the liquid ejection head 100 are increased, but the elastic member 431 can be manufactured more easily compared with the two-color molding method.

It is also desirable that the electrical wiring unit 12 that abuts on the abutting unit 460 is a flexible wiring board. In a case where the electrical wiring unit 12 is formed with a flexible member, such as a flexible wiring board, sealing performance between the abutting unit 460 and the electrical wiring unit 12 is improved, and the infiltration of liquid into the electrical contact portion 402 can be further suppressed.

As described above, the liquid ejection head 100 according to the present exemplary embodiment can be easily attached to and detached from the recording apparatus 10 while suppressing infiltration of liquid into the electrical contact portion 402 with the recording apparatus 10.

To summarize the present disclosure described above, the present disclosure includes the following configurations.

According to the present disclosure, it is possible to provide a liquid ejection head that suppresses infiltration of liquid into an electrical contact portion of the liquid ejection head and can be easily attached to and detached from a recording apparatus, and a recording apparatus having the liquid ejection head.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-191507, filed Nov. 30, 2022, which is hereby incorporated by reference herein in its entirety.

What is claimed is:

1. A liquid ejection head comprising:

an ejection element substrate configured to eject liquid to perform recording;

an electrical contact portion configured to be electrically connected to an electrical wiring unit of an ejection apparatus to supply power to the ejection element substrate;

a housing configured to include an opening portion into which the electrical wiring unit is inserted and to be provided with the electrical contact portion inside; and an opening/closing member configured to open and close the opening portion, wherein, in a closed state in which the opening/closing member closes the opening portion, the electrical wiring unit is sandwiched between the opening/closing member and a part of the housing.

2. The liquid ejection head according to claim 1, wherein the opening/closing member includes a protruding portion, and wherein the housing includes a concave portion with which the protruding portion engages in the closed state.

3. The liquid ejection head according to claim 1, wherein the opening/closing member includes a fixing portion fixed to the housing and is configured to rotate using the fixing portion as a fulcrum.

4. The liquid ejection head according to claim 1, wherein the opening/closing member includes an elastic portion that abuts on the electrical wiring unit in the closed state.

5. The liquid ejection head according to claim 4, wherein the elastic portion is joined to the opening/closing member.

6. The liquid ejection head according to claim 1, further comprising an ejection unit provided with the ejection element substrate including a pressure generation element configured to generate pressure for ejecting liquid, and a flexible wiring board electrically connected to the ejection element substrate, wherein an electrical relay board electrically connected to the flexible wiring board to relay electricity to the flexible wiring board is arranged inside the housing, and wherein the electrical contact portion is formed at an end of the electrical relay board.

7. The liquid ejection head according to claim 6, wherein the pressure generation element is a piezoelectric element driven by application of voltage.

8. The liquid ejection head according to claim 6, further comprising:

a support member configured to support the ejection unit and to be arranged between the ejection unit and the housing; and a sealing member configured to seal a gap between the housing and the support member.

9. The liquid ejection head according to claim 8, wherein the sealing member is bonded to the housing.

10. The liquid ejection head according to claim 8, wherein the sealing member is joined to the housing.

11. The liquid ejection head according to claim 1, wherein the housing includes a liquid connection portion fluidly connected to the ejection apparatus.

12. The liquid ejection head according to claim 11, wherein the liquid ejection head includes at least two electrical contact portions and two opening/closing members, and wherein the at least two opening/closing members face each other so as to sandwich the liquid connection portion.

13. The liquid ejection head according to claim 12, wherein the at least two opening/closing members are configured to be respectively opened and closed in opposite directions.

14. The liquid ejection head according to claim 1, wherein the electrical wiring unit is a flexible wiring board.

15. An ejection apparatus comprising:

a liquid ejection head having:

an ejection element substrate configured to eject liquid to perform recording, an electrical contact portion configured to be electrically connected to an electrical wiring unit of the ejection apparatus to supply power to the ejection element substrate, a housing configured to include an opening portion into which the electrical wiring unit is inserted and to be provided with the electrical contact portion inside, and an opening/closing member configured to open and close the opening portion, wherein, in a closed state in which the opening/closing member closes the opening portion, the electrical wiring unit is sandwiched between the opening/closing member and a part of the housing.

* * * * *